(12) United States Patent
Achten et al.

(10) Patent No.: US 10,912,242 B2
(45) Date of Patent: Feb. 9, 2021

(54) SOIL-WORKING DEVICE HAVING AN OVERLOAD PROTECTION MEANS

(71) Applicant: LEMKEN GMBH & CO KG, Alpen (DE)

(72) Inventors: Georg Achten, Tönisvorst (DE); Wilhelm Meurs, Alpen (DE); Georg Paulessen, Willich (DE)

(73) Assignee: LEMKEN GMBH & CO KG, Alpen (DE)

( * ) Notice: Subject to any disclaimer, the term of this patent is extended or adjusted under 35 U.S.C. 154(b) by 0 days.

(21) Appl. No.: 16/315,056

(22) PCT Filed: Jul. 5, 2017

(86) PCT No.: PCT/DE2017/100561
§ 371 (c)(1),
(2) Date: Jan. 3, 2019

(87) PCT Pub. No.: WO2018/006907
PCT Pub. Date: Jan. 11, 2018

(65) Prior Publication Data
US 2019/0335649 A1    Nov. 7, 2019

(30) Foreign Application Priority Data

Jul. 7, 2016  (DE) .................. 10 2016 112 522

(51) Int. Cl.
*A01B 61/04* (2006.01)
*A01B 21/08* (2006.01)
*E02F 3/24* (2006.01)
*E02F 3/26* (2006.01)

(52) U.S. Cl.
CPC .......... *A01B 61/046* (2013.01); *A01B 21/086* (2013.01); *E02F 3/24* (2013.01); *E02F 3/26* (2013.01)

(58) Field of Classification Search
CPC ............... A01B 1/046; E02F 3/24; E02F 3/26
USPC .................................................. 172/264–266
See application file for complete search history.

(56) References Cited

U.S. PATENT DOCUMENTS

| | | | | |
|---|---|---|---|---|
| 2,906,353 | A * | 9/1959 | Rogers | A01B 35/22 172/265 |
| 3,561,541 | A * | 2/1971 | Woelfel | A01B 61/046 172/260.5 |
| 3,642,074 | A * | 2/1972 | Geurts | A01B 61/046 172/260.5 |
| 3,782,481 | A * | 1/1974 | Quanbeck | A01B 35/22 172/265 |
| 4,200,157 | A * | 4/1980 | Anderson | A01B 61/046 172/264 |

(Continued)

FOREIGN PATENT DOCUMENTS

| DE | 10007156 A1 | 8/2001 |
|---|---|---|
| DE | 103 58 208 | 7/2005 |

(Continued)

*Primary Examiner* — Tara Mayo-Pinnock
(74) *Attorney, Agent, or Firm* — Duane Morris LLP; Gregory M. Lefkowitz; Jason M. Nolan

(57) ABSTRACT

The invention relates to a soil-working device having an overload protection means, in the case of which overload protection means rebound energy is reduced after the soil-working device returns from an overload position to the working position.

8 Claims, 4 Drawing Sheets

(56) References Cited

U.S. PATENT DOCUMENTS

| | | | | |
|---|---|---|---|---|
| 4,700,785 | A * | 10/1987 | Bartusek et al. | A01B 61/046 111/84 |
| 5,921,010 | A * | 7/1999 | Schulte et al. | E01H 5/063 172/260.5 |
| 6,564,728 | B2 * | 5/2003 | Ryan et al. | A01B 61/046 111/123 |
| 6,695,069 | B2 | 2/2004 | Rozendaal | |
| 8,596,374 | B2 * | 12/2013 | Kile | A01B 23/02 172/265 |
| 10,412,875 | B2 * | 9/2019 | Kovach | A01B 23/02 |
| 2003/0205392 | A1 | 11/2003 | Ruckle et al. | |

FOREIGN PATENT DOCUMENTS

| | | |
|---|---|---|
| DE | 1 300 060 | 1/2006 |
| SU | 828997 A1 | 5/1981 |
| WO | 2016086918 | 6/2016 |

\* cited by examiner

SOIL-WORKING DEVICE HAVING AN OVERLOAD PROTECTION MEANS

CROSS-REFERENCE TO RELATED APPLICATIONS

This application is a § 371 national stage entry of International Application No. PCT/DE2017/100561, filed Jul. 5, 2017, which claims priority to German Patent Application No. 10 2016 112 522.9, filed Jul. 7, 2016, the entire contents of which are incorporated herein by reference.

The invention relates to a soil-working device having an overload protection means, which is moved mechanically in a direction of travel over a soil surface of an agricultural field to be worked and is equipped with tools for loosening or cutting the soil surface.

From the German patent application DE 10 358 208 A1 is known a compact disc harrow having vertically pivotable stalks on which rotatable cutting discs are arranged, wherein the pivotability of the stalk is realised with four rubber profiles, which are clamped between a frame pipe and two stalk-sided profiles. When the cutting disc meets an obstacle in the soil, the rubber profiles are elastically deformed and the stalk pivots upwards relatively to the frame. As a result of differing penetration resistances of the cutting discs into the ground surface to be worked, an exact and defined depth setting of the cutting discs is not guaranteed.

In the European patent document EP 1 300 060 B1 is also described a compact disc harrow, in the case of which tools in the form of rotatable cutting discs are supported vertically pivotably with a stalk on a frame. In this regard, the stalks abut on a lower stop and are held from above with a biased spring accumulator in working position and can, when meeting an obstacle, yield upwards. By means of the defined position of the stalk on the stop, an exact depth guidance is guaranteed. In particular in the case of high biasing forces on the spring accumulator in light, but nevertheless stony soil, this type of overload protection activates more frequently, such that when the stalk impacts upon the stop, high rebound energies have to be absorbed, which stresses the involved parts.

Task of the invention is to provide an improved overload protection for soil-working devices and to eliminate the disadvantages described above.

This task is solved by the characteristics of the disclosed overload protection means for a soil-working device, which is moved mechanically in a direction of travel over a soil surface of an agricultural field to be worked and is equipped with tools for loosening or cutting the soil surface.

By assigning an energy storage device to the depth stop, the impact energy of the stalk out of the upper overload position is no longer solely and abruptly guided through the stop into the frame, but rather is at least partially absorbed by the energy storage device assigned to the depth stop. In this way, the depth stop itself as well as the surrounding supports and components can be dimensioned in a manner which is smaller, more durable and more economical.

By the clever disposition of the energy storage device, the depth stop and the stalk relative to the frame or to the cross pipe, also the release energy of the stalk when pivoting about the transverse axis into the upper overload position, when the tool meets a foreign object, can be guided into the same energy storage device which also absorbs the impact energy of the stalk onto the depth stop when the stalk rushes quickly out of the upper overload position down again. Here, the stalk springs temporarily into a lower overload position and is guided back by the energy storage device and the depth stop into the working position which constitutes the target position of the tool during the soil working.

By means of a special arrangement of the energy storage device in relation to the frame or to the transverse axis about which the stalk pivots, as well as to the depth stop and to the bearing bracket, differently large disengaging torques of the overload protection into the respective upper or lower overload position of the device can be realised. Thus, the disengaging torque of the overload protection into the upper overload position can be selected to be greater when, by means of the operation of the tool in the soil surface, drive forces directed upwards are to be expected. This occurs for example in the case of disc harrows or cultivators with discs or tines which are less aggressively positioned. On the other hand, one can select the disengaging torque of the overload protection in the upper overload position as less than that in the lower overload position, when the tool is drawn of itself into the soil surface by the forward movement of the soil working device. This is for example the case with a soil working device having accordingly aggressive downward-engagement.

Depending on the biasing or triggering force of the energy storage device which is to be applied, this can be formed as a single-part or multiple-part elastic spring, for example as a spiral spring. By means of the slotting of several spiral springs of different diameter into one another, compact constructions having very different spring rates can be realised. Analogously, a combination of different leaf springs, flexible springs, compression springs, tension springs or torsion springs is possible. Also, elastomer blocks having resilient and damping effect can be used.

A further possibility for an energy storage device is constituted by hydraulic actuating cylinders, the effective compression chamber surfaces of which are of differing sizes or are connected with different pressures with one or several pressure reservoirs.

By connecting the energy storage device with the stalk on the one hand and a movable counter-bearing on the frame on the other hand, the depth stop can be disposed preferably in an articulated manner between the stalk and the movable counter-bearing. By means of this disposition, a compact construction of the overload protection can be realised which allows a pivoting of the stalk around a transverse axis into an upper and lower overload position.

If the depth stop is disposed at least partially within or near the outer contour of the energy storage device, the pressure and tensile forces act on the energy storage device or on the depth stop in similar direction such that the force introduction takes place into the respective articulated bearing either of both bearing points or supporting points of the energy storage device or of the depth stop in spatial proximity to one another.

The compact construction of the overload protection is supported in that the depth stop is formed in one operating direction rigid and in the other operation at least partially resilient. This example is realised by a stop lug in which at least one articulation point is formed as an aperture in the form of a longitudinal hole. Instead of a longitudinal hole lug, for example also a traction cable or a link chain or a joint chain can be used. Conversely, also an elastic or movable compression member is conceivable which by means of a blocking or stop device does not undershoot a minimal installation dimension.

The present device is in particular suitable for use in a cultivator or loosening device, on which cultivator shares or loosening shares are fastened on the respective stalks and distanced from one another. In the same way, the device finds a use in a (compact) disc harrow or rolling harrow, on which at the end side of the stalk for example rotating hollow disk tools are mounted which penetrate into the soil surface The invention excels in particular in that a depth stop, which defines the working position of a soil-working tool on a stalk, is not rigidly assigned to a machine frame but rather by means of an energy storage device absorbs at least partially the impact energy of the stalk with the tool fastened thereon at the activation of the overload protection device and the resetting thereof and guides it spring-loaded or damped into the frame of the soil-working device. In particular when there is frequent activation of the overload protection, such as is the case on a soil surface to be worked which is heavily riddled with foreign objects, the lifetime of the overload protection according to the invention is significantly increased.

Further details and advantages of the subject matter of the invention result from the following description and the drawings belonging thereto, in which an embodiment example is shown with the details and individual parts necessary therefor.

Figure 1:
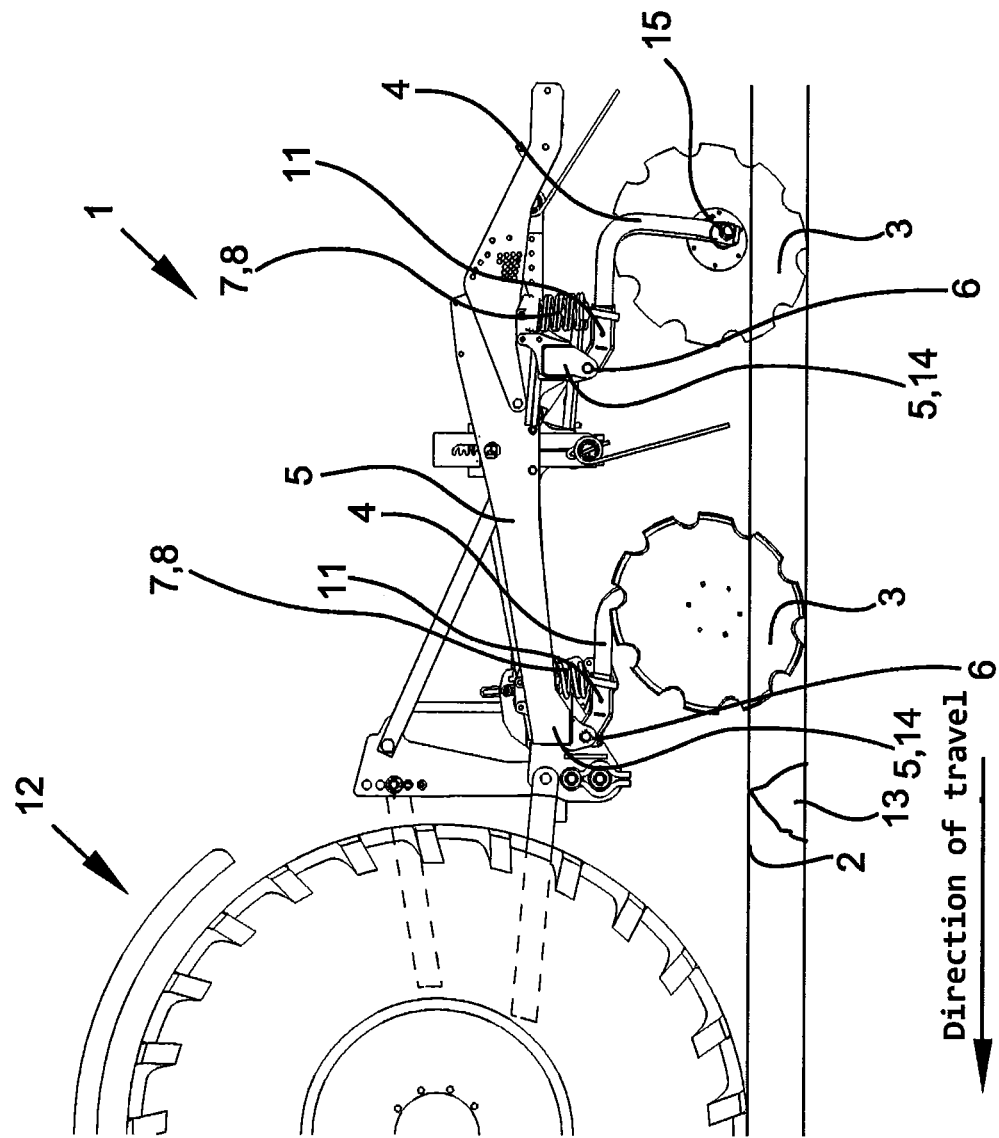
FIG. 1 shows a side view of a soil-working device according to the invention.

FIG. 1 shows the side view of an agricultural soil-working device 1 which is drawn by a traction engine 12 in a direction of travel over a soil surface 2 of an agricultural field, in order to work this, to loosen it or to incorporate material into the soil surface. The soil-working device 1 consists of a frame 5, at which, viewed from above onto the device, soil-working tools 3 are disposed laterally and/or behind one another. Preferably, the soil-working device is equipped with one or several transverse pipes 14, which extend laterally over the breadth of the soil-working device 1 and above the soil surface 2 and of which in each case stalks 4 are fastened which are fastened with their one end on the transverse pipe 14 or frame 5 and at the other ends of which are fastened one or several soil-working tools. These can be shares, cutting tools, loosening tines, wing shares or similar tools, or, as shown here, cutting discs which are disposed rotatably with a bearing 15 at the lower end of the stalk 4. By means of the oblique position of the tools 3 formed as hollow discs in direction of travel and/or at an angle to the soil surface 2, these penetrate into the soil surface 2 and loosen or mix soil material during the forward travel of the soil-working device 1 with the traction engine 12. The line shown on the lower end of the tools 3 indicates the working depth of the tools 3 below the soil surface 2. The arrow shown therebelow points in the direction of travel. On or below the soil surface, obstacles 13 such as stones or other foreign objects can lie, which the tools 3 can meet during forward travel and release the overload protection 7. The stalks 4 are pivotably fastened about a transverse axis 6 preferably in vertical direction on the frame 5 or transverse pipe 14 by means of a bearing bracket 11. The bearing bracket 11 or the stalk 4 is equipped with an overload protection 7 which by means of the exerted force of an energy storage device 8 retains the bearing bracket 11 or the stalk 4 in the intended working position which is intended for the tools 3 and implied by the line shown below the soil surface 2. The depth guiding of the soil-working device 1 relative to the soil surface takes place by means of the tools 3 of the soil-working device 1 themselves, by means of the biased traction engine 12 which bears the soil-working device 1 or by means of further depth guiding devices belonging to the soil-working device 1 which are not shown here, such as for example a roller, support wheels or transport wheels or other suitable depth guidance devices, which are connected with the frame 5 and can be rigidly or movably to be adjusted connected.

Figure 2:
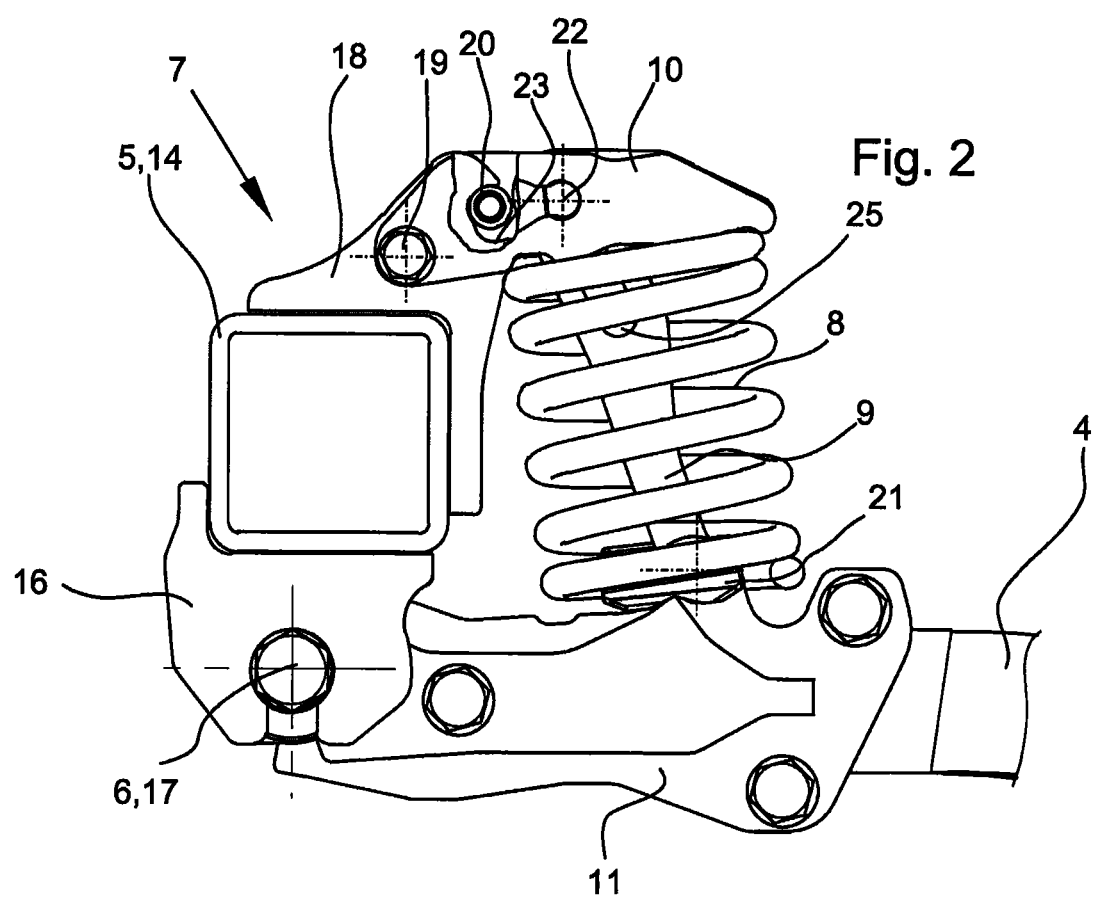
FIG. 2 shows a view of the overload element in working position.

FIG. 2 shows the previously described overload protection device 7 in its working position. On the frame 5, which is shown here in side view in a cutout, a bearing bracket 11 is connected, pivotably around a transverse axis 6, with the transverse pipe 14 of the frame 5. On the transverse pipe 14 are fastened for example bearing lugs 16, which accommodate the bracket 11 preferably vertically pivotably. Both the bearing lug 16 and the bearing bracket 11 are here equipped with transverse holes through which is inserted a bolt 17 and which form the transverse axis 6 about which the movement takes place. Also other forms of the bearing are conceivable, as well as a direct fastening of the stalk 4 without a further bearing bracket 11. On the upper side of the transverse pipe 14 is fastened on the transverse pipe 14 approximately at the level of the bearing bracket 11 a further bracket 18. The bracket 18 is equipped with transverse holes for the reception of a further axis 19 about which a counter-bearing 10 is pivotably supported in the same way vertically or in the direction of movement of the bearing bracket 11. At the upper rear end, the bracket 18 is equipped with a further elongated recess 23, in which a stop 20 connected with the counter-bearing 10 moves within the recess 23 and defines an upper and a lower position of the counter-bearing 10 relative to the bracket 18. Between the counter-bearing 10 and the bearing bracket 11 is disposed an energy storage device 8 in the form of a spiral spring, which is supported at its upper end against the counter-bearing 10 and a lower end via a bridge 21 on the bearing bracket 11. In this regard, the bearing bracket 11 is equipped with a sharp edge, which together with a pre-formed recess below the bridge 21 constitutes a line- or tilting bearing, self-centring under load of the energy storage device 8. The counter-bearing 10 is equipped with a further bolt 22 at which a depth stop 9 is suspended in the form of a pull tab having a recess 25. The lower end of the depth stop 9 is connected movably with the bearing bracket 11 or the stalk 4, wherein the connection is covered by the bridge 21. The dimensioning of the depth stop 9 is selected such that the energy storage device 8 between counter-bearing 10 and bearing bracket 11 is under bias and with this biasing force fixes the counter-bearing as shown with the stop 20 into the upper position of the counter-bearing, which position is predetermined by the recess 23 of the bracket 18. The bias of the energy storage device 8 is selected such that the counter-bearing 10 by means of the dead weight of the bracket 11, of the stalk 4 and of the soil-working tool fixed thereon, or its downwards engaging forces, cannot of itself be drawn into the lower position, but rather remains in the shown position which defines a working position of the stalk 4 or of the tool fastened thereon. At the same time, the bias of the energy storage device 8 is of a size such that no lifting forces of the tool, which result from the normal soil resistance at forwards travel of the soil-working device, effect a lifting of the stalk 4 out of the working position.

Figure 3:
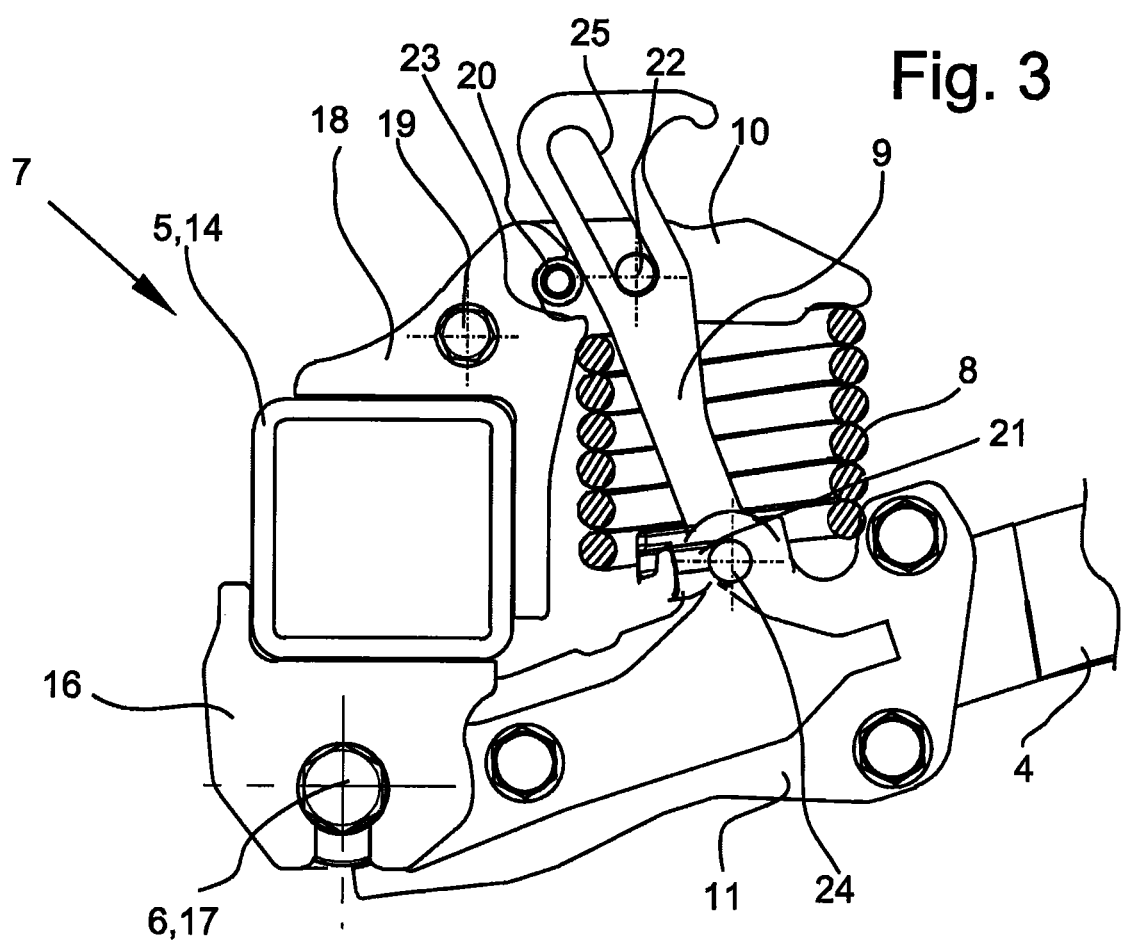
FIG. 3 shows the view from FIG. 2 as cross-section in upper overload position and FIG. 4 shows the same cross-section in lower overload position.
Figure 4:
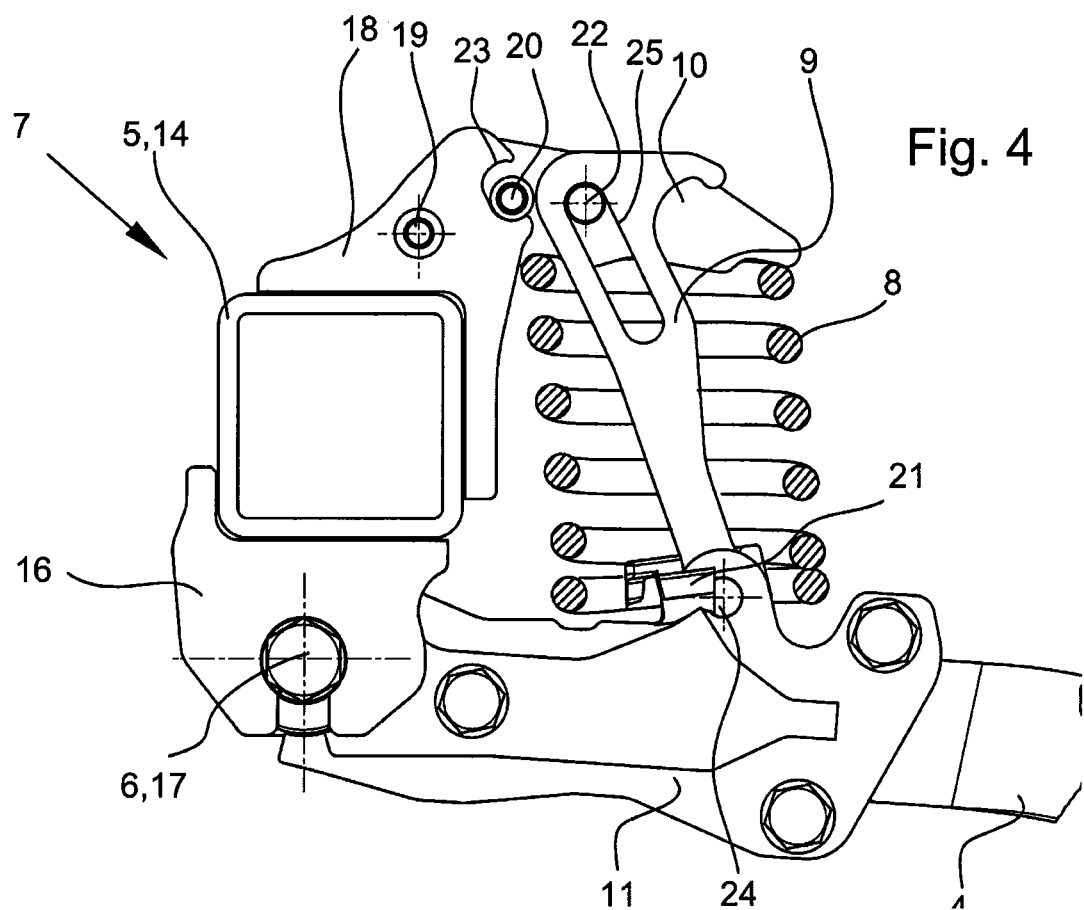

In FIG. 3 is shown the cross-section of the overload protection device 7 in the upper overload position, such as occurs at an impact of the tool on an obstacle. When the tool mounted on the stalk 4 impacts on an obstacle in the soil, the stalk 4 swings together with the bearing bracket 11 about the transverse axis 6 upwards and compresses by means of the bridge 21 the energy storage device 8. The energy storage device 8 abuts on the counter-bearing 10 and holds it in the upper position which is predetermined by the stop 20, which abuts in the recess 23 of the bracket 18 at the upper end. With the compressing of the energy storage device 8, at the same time, the depth stop 9 which is connected in articulated manner with the bearing bracket 11 via the bolt 24, is lifted out. Through an elongated recess 25 in the upper region of the depth stop 9, this can lift up until the lower end of the recess abuts on the bolt 22 which is connected with the counter-bearing 10. This position prescribes the maximum deviation of the stalk 4 or of the bracket 11 into overload position, which at the same time, as shown, corresponds to the maximum compression or the minimum installation dimension of the energy storage device 8. The bridge 21 as connection between energy storage device 8 and bearing bracket 11 is in FIG. 3 and FIG. 4 shown only partially, in order to expose the bolt 24 as articulated connection between bearing bracket 11 and depth stop 9, since this would otherwise be covered in the representation.

After passing the obstacle in the soil, the stalk 4 swings together with the bearing bracket 11 back into the working position, as is described under FIG. 2. To this end, the depth stop 9 slides with its recess 25 downwards until the upper end of the recess 25 abuts on the bolt 22. According to FIG. 4, the counter-bearing 10 is drawn by the impact energy of the depth stop 9, which impacts on the bolt 22, against the spring force of the energy storage device 8 downwards until the stop 22 abuts on the lower side of the recess 23 of the bracket 18. By means of this yielding of the counter-bearing 10, the stalk 4 and the bearing bracket 11 can pivot about the axis 6 further downwards, so that the impact energy which the depth stop 9 has exerted on the counter-bearing 10 and the energy storage device 8 via the bolt 22, is compensated by the energy storage device 8 or at least partially mitigated. In the same way, a part of the impact energy can be absorbed by the deeper penetration of the tool into the soil. By means of the movement of the counter-bearing 10 relatively to the bracket 18 about the axis 19, the energy storage device 8 is at the rear end of the counter-bearing 10 more strongly deformed than at the front side of the counter-bearing 10, at which the energy storage device 8 also abuts. By means of this deformation there results a rebound force of the energy storage device 8 onto the counter-bearing 10, with which the depth stop 9 is lifted over the bolt 22 back into the position as is shown in FIG. 2. In this regard, the rebound force of the energy storage device 8 is dimensioned such that the depth stop 9 via its connection to bearing bracket 11 or to the stalk 4 draws back the tool for soil-working, the stalk 4 and the bearing bracket 11, against its deadweight and a possible engaging below of the tool, pivotingly about its axis 6 into its original working position, as shown in FIG. 2. There follow 4 pages of drawings.

| LIST OF REFERENCE SIGNS | |
|---|---|
| 1 | soil-working device |
| 2 | soil surface |
| 3 | tool |
| 4 | stalk |
| 5 | frame |
| 6 | transverse axis |
| 7 | overload protection device |
| 8 | energy storage device |
| 9 | depth stop |

| LIST OF REFERENCE SIGNS | |
|---|---|
| 10 | counter-bearing |
| 11 | bearing bracket |
| 12 | traction engine |
| 13 | obstacle |
| 14 | transverse pipe |
| 15 | bearing |
| 16 | bearing lug |
| 17 | bolt |
| 18 | bracket |
| 19 | axis |
| 20 | stop |
| 21 | bridge |
| 22 | bolt |
| 23 | recess |
| 24 | bolt |
| 25 | recess |

The invention claimed is:

1. A soil-working device, which is moved mechanically in a direction of travel over a soil surface of an agricultural field to be worked, comprising:
   one or more tools for loosening or cutting the soil surface,
   wherein the one or more tools are disposed on a frame perpendicularly to the direction of travel of the soil-working device next to one another and in one or several rows one behind the other spaced with one or more stalks corresponding to the one or more tools,
   wherein the one or more stalks are disposed respectively via at least one transverse axis vertically pivotably on the frame,
   wherein between each of the one or more stalks and the frame is disposed an overload protection device comprising at least one energy storage device and a depth stop corresponding to the at least one energy storage device,
   wherein the depth stop defines a working position of the respective tool and each of the at least one energy storage devices facilitate a pivoting movement of the respective one or more stalks out of the working position into an upper overload protection position when the respective tool impacts on an obstacle in the soil, and a returning of the respective one or more stalks into the working position when the obstacle has been passed,
   wherein each of the at least one energy storage device in the working position is preloaded with a basic energy or basic force, and
   wherein the at least one energy storage device corresponding to the depth stop is configured such that, when the respective one or more stalks abuts an obstacle the depth stop generates or allows a movement of the respective stalk out of the working position into a lower overload protection position and after the obstacle passes generates or allows a returning of the respective stalk into the working position.

2. The soil-working device according to claim 1, wherein the energy out of the movement of the stalk out of the working position into the upper overload position and into the lower overload position is guided into the same energy storage device.

3. The soil-working device according to claim 1, wherein a first disengaging torque acting through the energy storage device about the transverse axis onto the stalk into the upper overload protection position and a second disengaging torque into the lower overload protection position are different from one another.

4. The soil-working device according to claim 1, wherein the energy storage device is formed as a single-part or multiple-part elastic spring.

5. The soil-working device according to claim 1, wherein the energy storage device is connected at least indirectly with the respective stalk and with a movable counter-bearing which is supported pivotably on the frame.

6. The soil-working device according to claim 1, wherein the depth stop is at least partially enclosed by a contour of the energy storage device.

7. The soil-working device according to claim 1, wherein the depth stop is formed in one operating direction rigidly and in another operating direction at least partially resiliently.

8. The soil-working device according to claim 1, wherein the each of the one or more tools fastened on the one or more corresponding stalks are adapted for soil-working as loosening shares, cultivator shares, or as a cutting or mixed-use tool rotating relatively to the respective stalk around a bearing acting as rotational axis.

* * * * *